US012766750B2

(12) United States Patent
Kling et al.

(10) Patent No.: US 12,766,750 B2
(45) Date of Patent: Oct. 20, 2026

(54) SHAVING RAZOR SYSTEM

(71) Applicant: The Gillette Company LLC, Boston, MA (US)

(72) Inventors: Björn Kling, Glashuetten-Oberems (DE); Franziska Schmid, Frankfurt am Main (DE); Marianne Malmbak, Idstein (DE); Dina Wasfi Abdulaal, Boston, MA (US)

(73) Assignee: The Gillette Company LLC, Boston, MA (US)

( * ) Notice: Subject to any disclaimer, the term of this patent is extended or adjusted under 35 U.S.C. 154(b) by 79 days.

(21) Appl. No.: 19/027,306

(22) Filed: Jan. 17, 2025

(65) Prior Publication Data

US 2025/0236034 A1 Jul. 24, 2025

Related U.S. Application Data

(60) Provisional application No. 63/622,839, filed on Jan. 19, 2024.

(51) Int. Cl.
*B26B 21/52* (2006.01)
*B26B 21/06* (2006.01)
*B26B 21/22* (2006.01)

(52) U.S. Cl.
CPC ............ *B26B 21/522* (2013.01); *B26B 21/06* (2013.01); *B26B 21/222* (2013.01)

(58) Field of Classification Search
CPC ...... B26B 21/522; B26B 21/06; B26B 21/222
See application file for complete search history.

(56) References Cited

U.S. PATENT DOCUMENTS

| | | | | | |
|---|---|---|---|---|---|
| D421,320 | S | * | 2/2000 | Coffin | D28/48 |
| D590,996 | S | | 4/2009 | Nakasuka | |
| D604,905 | S | * | 11/2009 | Psimadas | D28/48 |

(Continued)

FOREIGN PATENT DOCUMENTS

| | | |
|---|---|---|
| CN | 3079522 | 6/1998 |
| CN | 3438205 | 4/2005 |

(Continued)

OTHER PUBLICATIONS

PCT Search Report and Written Opinion for PCT/US2025/011622 dated Mar. 20, 2025, 12 pages.

(Continued)

*Primary Examiner* — Omar Flores Sanchez
(74) *Attorney, Agent, or Firm* — John M. Lipchitz

(57) ABSTRACT

A shaving razor system with a shaving razor handle having an upper surface that is generally convex and an opposing lower surface that is generally concave. The lower surface defines a recessed area located toward a distal end of the handle configured to receive multiple digits of a user. The recessed area located toward the distal end has a surface area of about 800 $mm^2$ to about 1500 $mm^2$ and a length about of 45 mm to about 75 mm. The upper surface defines a recessed area located toward a proximal end of the handle configured to receive one or more digits of a user. The recessed area located toward the proximal end having a width of about 20 mm to about 35 mm. A shaving razor cartridge with at least one blade with a cutting edge is mounted to the proximal end of the handle.

20 Claims, 6 Drawing Sheets

(56) References Cited

U.S. PATENT DOCUMENTS

| | | | | | |
|---|---|---|---|---|---|
| D710,542 | S | | 8/2014 | Eagleton et al. | |
| D739,980 | S | | 9/2015 | Psimadas et al. | |
| D747,550 | S | * | 1/2016 | Eagleton | D28/48 |
| D805,252 | S | | 12/2017 | Newlin | |
| D816,271 | S | | 4/2018 | Huang | |
| D843,658 | S | * | 3/2019 | Kong | D28/48 |
| D861,251 | S | | 9/2019 | Cabrera | |
| D864,482 | S | | 10/2019 | Goeder et al. | |
| D876,722 | S | | 2/2020 | Psimadas et al. | |
| D882,174 | S | | 4/2020 | Goeder et al. | |
| D882,175 | S | | 4/2020 | Riehle et al. | |
| D933,840 | S | | 10/2021 | Hermann et al. | |
| D957,057 | S | | 7/2022 | Riehle et al. | |
| D957,058 | S | | 7/2022 | Riehle et al. | |
| D972,212 | S | | 12/2022 | Lin | |
| D980,526 | S | | 3/2023 | Waterman | |
| D1,028,356 | S | | 5/2024 | Fu | |
| 12,162,175 | B2 | * | 12/2024 | Ortins | B26B 21/4068 |
| D1,057,282 | S | | 1/2025 | Riehle | |
| D1,057,283 | S | | 1/2025 | Riehle | |
| D1,062,062 | S | | 2/2025 | Ramm | |
| D1,072,348 | S | | 4/2025 | Wu | |
| D1,085,536 | S | | 7/2025 | Desmarais et al. | |
| D1,106,577 | S | * | 12/2025 | Park | D28/48 |
| 12,521,901 | B2 | * | 1/2026 | Carbonell | B26B 21/521 |
| D1,112,935 | S | | 2/2026 | Tanaka et al. | |
| 2004/0177518 | A1 | * | 9/2004 | Leventhal | B26B 21/52<br>30/526 |
| 2011/0167653 | A1 | | 7/2011 | Psimadas et al. | |
| 2013/0081276 | A1 | | 4/2013 | Wain et al. | |
| 2013/0081289 | A1 | | 4/2013 | Wain et al. | |
| 2014/0230258 | A1 | | 8/2014 | Eagleton et al. | |
| 2019/0299459 | A1 | | 10/2019 | Patel et al. | |
| 2020/0086516 | A1 | | 3/2020 | Brellis et al. | |
| 2022/0176577 | A1 | * | 6/2022 | McGarry | B26B 21/521 |
| 2023/0415366 | A1 | * | 12/2023 | Kilsby | B26B 21/222 |
| 2025/0236033 | A1 | * | 7/2025 | Carbonell | B26B 21/521 |
| 2025/0236035 | A1 | * | 7/2025 | Kling | B26B 21/522 |
| 2025/0236036 | A1 | * | 7/2025 | Kling | B26B 21/225 |
| 2025/0236037 | A1 | * | 7/2025 | Kling | B26B 21/4018 |

FOREIGN PATENT DOCUMENTS

| | | | |
|---|---|---|---|
| CN | 300762752 | S | 4/2008 |
| CN | 301119417 | S1 | 1/2010 |
| CN | 301277140 | S | 6/2010 |
| CN | 301366023 | S | 10/2010 |
| CN | 301680491 | S | 9/2011 |
| CN | 301817047 | S | 1/2012 |
| CN | 301873808 | S | 3/2012 |
| CN | 302432876 | S | 5/2013 |
| CN | 302478284 | S | 6/2013 |
| CN | 303103416 | S | 2/2015 |
| CN | 303200601 | S | 4/2015 |
| CN | 303574342 | S | 1/2016 |
| CN | 303731571 | S | 6/2016 |
| CN | 303962048 | S | 12/2016 |
| CN | 304075970 | S | 3/2017 |
| CN | 304201810 | S | 11/2017 |
| CN | 304719237 | S | 7/2018 |
| CN | 304948039 | S | 12/2018 |
| CN | 305024638 | S | 2/2019 |
| CN | 305100264 | S | 4/2019 |
| CN | 305218883 | S | 6/2019 |
| CN | 305218884 | S | 6/2019 |
| CN | 305277442 | S | 7/2019 |
| CN | 305374227 | S | 10/2019 |
| CN | 305673882 | S | 3/2020 |
| CN | 305795803 | S | 5/2020 |
| CN | 305795804 | S | 5/2020 |
| CN | 306192800 | S | 11/2020 |
| CN | 306516203 | S | 5/2021 |
| CN | 306554119 | S | 5/2021 |
| CN | 306689412 | S | 7/2021 |
| CN | 306849744 | S | 9/2021 |
| CN | 306931406 | S | 11/2021 |
| CN | 306935491 | S | 11/2021 |
| CN | 306987154 | S | 12/2021 |
| CN | 307103245 | S | 2/2022 |
| CN | 307313200 | S | 5/2022 |
| CN | 307518436 | S | 8/2022 |
| CN | 307673300 | S | 11/2022 |
| CN | 307801761 | S | 1/2023 |
| CN | 308010248 | S | 4/2023 |
| CN | 308010249 | S | 4/2023 |
| CN | 308055989 | S | 5/2023 |
| CN | 308126193 | S | 7/2023 |
| CN | 308147973 | S | 7/2023 |
| CN | 308216850 | S | 9/2023 |
| EP | 0615820 | A1 | 9/1994 |
| JP | 3025655 | U | 6/1996 |
| JP | 2004229703 | A | 8/2004 |
| JP | D1227037 | S | 1/2005 |
| JP | D1403327 | S | 12/2010 |
| JP | D1702443 | S | 12/2021 |
| JP | D1702474 | S | 12/2021 |
| KR | 301090565 | S | 1/2021 |
| KR | 3010982002 | S | 3/2021 |
| KR | 301172353 | S | 7/2022 |
| WO | 2019016163 | A1 | 1/2019 |

OTHER PUBLICATIONS

All Office Actions: U.S. Appl. No. 19/027,383, filed Jan. 17, 2025.
All Office Actions: U.S. Appl. No. 19/027,449, filed Jan. 17, 2025.
All Office Actions: U.S. Appl. No. 19/027,518, filed Jan. 17, 2025.
U.S. Appl. No. 19/027,383, filed Jan. 17, 2025, Björn Kling et al.
U.S. Appl. No. 19/027,449, filed Jan. 17, 2025, Björn Kling et al.
U.S. Appl. No. 19/027,518, filed Jan. 17, 2025, Björn Kling et al.
"The Gillette Venus Intimate Grooming Women Body and Pubic Razor Set", Retrieved from Internet: https://www.amazon.com/Gillette-Venus-Intimate-Grooming-Shaving/dp/B0G1CVV78WG/ref=cm_crarp_d_product_top?ie=UTF8Gillette flawless glide, www.amazon.com, No Known Date, 01page.

* cited by examiner

SHAVING RAZOR SYSTEM

FIELD OF THE INVENTION

The present invention relates to wet shaving safety razors and more particularly to shaving razor systems that have a shaving razor cartridge mounted to an ergonomically formed handle for shaving a person's under arms and/or pubic (or bikini) region of the body.

BACKGROUND OF THE INVENTION

In general, a cartridge or blade unit of a safety razor has at least one blade with a cutting edge which is moved across the surface of the skin being shaved by means of a handle to which the cartridge is attached. Some shaving razors are provided with a spring biased cartridge that pivots relative to the handle to follow the contours of the skin during shaving. The cartridge may be mounted detachably on the handle to enable the cartridge to be replaced by a fresh cartridge when the blade sharpness has diminished to an unsatisfactory level, or it may be attached permanently to the handle with the intention that the entire razor be discarded when the blade or blades have become dulled or in other ways perceived as unusable.

Razor blade assemblies have been disclosed wherein cutting edge portions of the blade members are held between skin engaging surfaces which are generally referred to as the guard and cap of the razor blade assembly. The guard contacts the skin in front of the blade member(s) and the cap contacts the skin behind the blade member(s) during a shaving stroke. The cap and guard may aid in establishing the so-called "shaving geometry", i.e., the parameters which determine the blade orientation and position relative to the skin during shaving, which in turn have a strong influence on the shaving performance and efficacy of the razor. The cap may comprise a water leachable shaving aid to reduce drag and improve comfort. The guard may be generally rigid, for example formed integrally with a frame or platform structure which provides a support for the blades. Guards may also comprise softer elastomeric materials to improve skin stretching.

Consumers shaving the pubic region of the body has been steadily growing market segment among women and men over the last several years. Products for the removal of unwanted hair from the body have been commercially available for many years. However, there are limited options available that specifically designed for pubic area shaving. The designs for shaving razors have focused primarily on facial and leg hair removal. These designs restrict how the user can hold the handle of the shaving razor. Other shaving devices that were originally designed to shave the face, such as electric razors and safety razors also do not lend themselves well when shaving the pubic region. The task of shaving the pubic region requires extreme care, patience, coordination, and spatial awareness to avoid cutting the skin or completely missing certain areas. Pubic region shaving is more difficult than shaving one's face because in certain positions the shaving razor or the area being shaved cannot be seen directly or with the aid of a mirror by the user. In addition, the pubic region is typically more sensitive, thus making proper control of the shaving razor and skin contact during shaving even more important.

The removal of hair from the pubic area creates a number of challenges for consumers. In particular, the ability to reach and fully remove all pubic hair remains a key unmet need for male and female shavers. The complex anatomical curves and skin mobility in the pubic area present specific challenges. Moreover, the nature of the hair in this area differs from that in other body sites, in terms of elevation angle, fiber shape and diameter. Therefore, hair removal devices available for the legs and underarms are not particularly effective at removal of pubic hair.

Commercially available products do not address these particular needs and typically are often simply provided as a generally smaller product to aid ease of handling of the device in the restricted bikini area. There is thus still a need to provide a hair removal device for the pubic hair area, which effectively cuts the hair type in this area in a safe, easy, and efficient manner such that the user of the device is confident during use and thereby ensures improved hair removal end result whilst reducing likelihood of any associated irritation. There is also a need for a shaving razor system having an ergonomic handle to allow for proper control and manipulation for shaving one's pubic region.

SUMMARY OF THE INVENTION

In one aspect, the invention features, in general a shaving razor system with a shaving razor handle having an upper surface that is generally convex and an opposing lower surface that is generally concave. The lower surface defines a recessed area located toward a distal end of the handle configured to receive multiple digits of a user. The recessed area located toward the distal end has a surface area of about 800 $mm^2$ to about 1500 $mm^2$ and a length about of 45 mm to about 75 mm. The upper surface defines a recessed area located toward a proximal end of the handle configured to receive one or more digits of a user. The recessed area located toward the proximal end having a width of about 20 mm to about 35 mm. A shaving razor cartridge with at least one blade with a cutting edge is mounted to the proximal end of the handle.

In another aspect, the invention features, in general a shaving razor system having a handle with an upper surface that is generally convex and an opposing lower surface that is generally concave. The upper surface defines a recessed area located toward a proximal end of the handle configured to receive one or more digits of a user. The recessed area located toward the proximal end having a width of about 20 mm to about 35 mm. A shaving razor cartridge is mounted to the proximal end of the handle, the shaving razor cartridge having at least one blade with a cutting edge, wherein a distance from the cutting edge to a forward edge of the recessed area of the proximal end is about 5 mm to about 10 mm.

In another aspect, the invention features, in general a shaving razor handle having an upper surface that is generally convex and an opposing lower surface that is generally concave. The lower surface defines a recessed area located toward a distal end of the handle configured to receive multiple digits of a user. The recessed area located toward the distal end has a surface area of about 750 $mm^2$ to about 950 $mm^2$ and a length of about 50 mm to about 70 mm. The upper surface defines a recessed area located toward a proximal end of the handle configured to receive multiple digits of a user. The recessed area located toward the proximal end having has a width of about 20 mm to about 35 mm.

BRIEF DESCRIPTION OF THE DRAWINGS

Other features and advantages of the present invention, as well as the invention itself, can be more fully understood from the following description of the various embodiments, when read together with the accompanying drawings, in which.

DETAILED DESCRIPTION OF THE INVENTION

When shaving one's face, a razor handle is typically held at an angle between 30 degrees and parallel to the plane of the surface of the skin being shaved, either in the form of downward strokes or upstrokes. This arrangement is generally comfortable and intuitive for the user and also provides good visibility when shaving in front of a mirror. The hand is kept a good distance from the shave surface, meaning that the reflected view of the area being shaved is not obscured by the shaver's own hand. This scenario has shaped the way razors have been designed and optimized for over one hundred years. However, the positional relationship between a shaving razor handle and the pubic region may vary significantly depending on the location that is being shaved.

Figure 1:
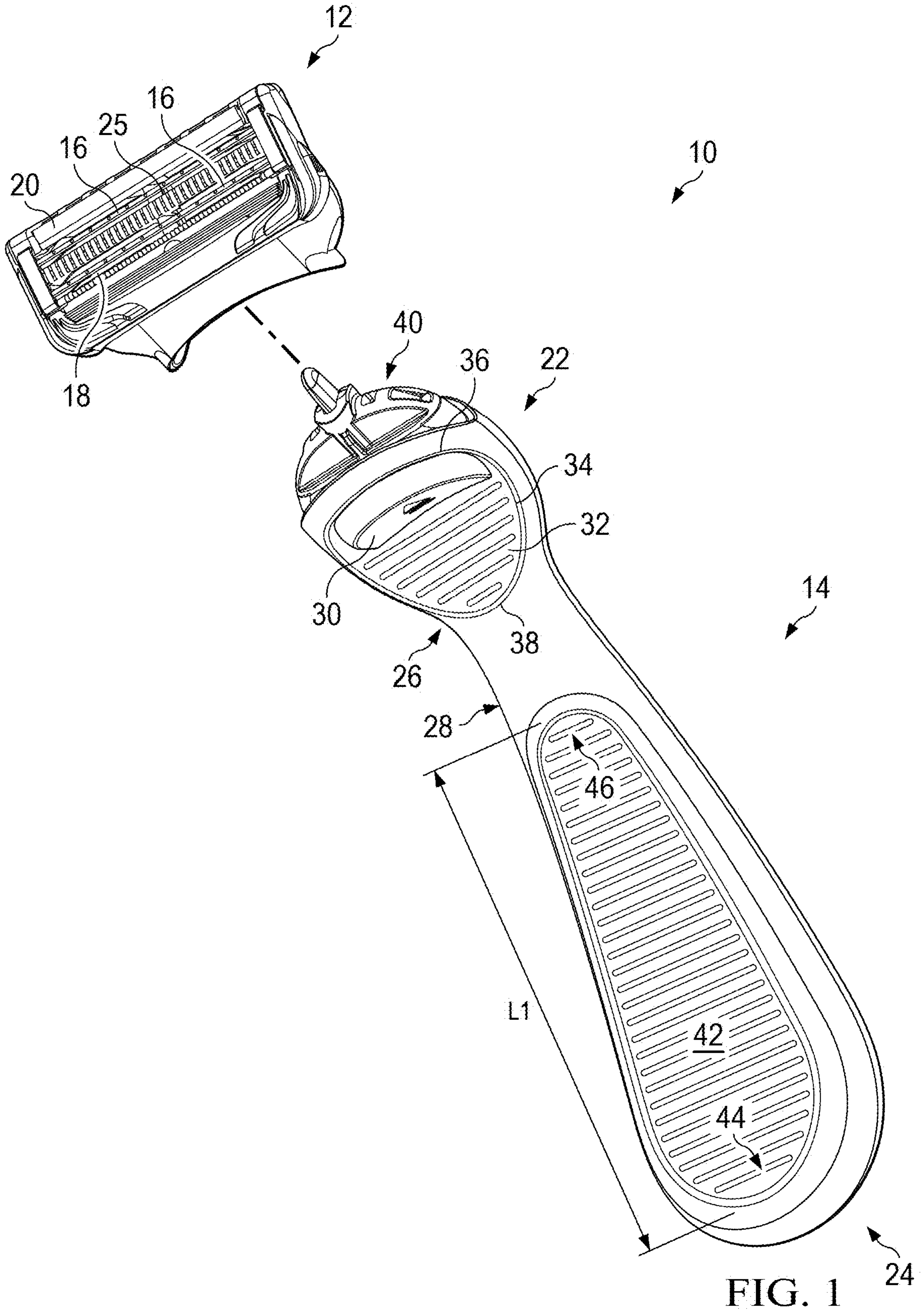
FIG. 1 is bottom perspective view of a shaving razor system with a detached shaving razor cartridge.

Referring to FIG. 1 a bottom perspective view of a shaving razor system 10 is shown. A shaving razor cartridge 12 may be mounted to a shaving razor handle 14. The handle 14 may have a nominal thickness of about 10 mm to about 14 mm. The shaving razor cartridge 12 may have at least one blade 16 for cutting hair. The at least one blade 16 may be positioned between a guard 18 and a cap 20 of the shaving razor cartridge 12. The guard 18, the cap 20 and the at least one blade 16 may define a shaving surface 25. The handle 14 may have a proximal end 22 a distal end 24. The cartridge 12 may be releasably mounted to the proximal end 22 of the handle 14. However, it is understood the cartridge 12 may be fixed to the proximal end 22 of the handle 14. Accordingly, the cartridge 12 and the handle 14 may be disposed as a unit once they blades are dull or become unusable. The handle 14 may include a neck 26. As will be described in greater detail below, the greatest width of the handle 14 may be located at the distal end 24 and the narrowest part of the handle 14 may be at the neck 26.

A lower surface 28 may extend extending between the proximal end 22 and the distal end 24 of the shaving razor handle 14. The lower surface 28 may have a generally concave profile. A cartridge ejection button 30 may be positioned on the lower surface 28 towards the proximal end. The cartridge ejection button 30 may be located on the same side of the shaving razor system 10 as the blade 16 (i.e., bottom side of the shaving razor handle 14). The cartridge ejection button 30 may be located on the same side of the shaving razor system 10 as the lower surface having a generally concave profile, which may be better suited for positioning the shaving razor system 10 while shaving the pubic region.

The cartridge ejection button 30 may be positioned within a recessed area defined by the lower surface 28. In certain embodiments, a rim 34 may extend around the recessed area 32. For example, the recessed area 32 may have a forward rim 36 and a rear rim 38. The recessed area 32 may have a surface area of about 750 $mm^2$ to about 950 $mm^2$ and more preferably about 800 $mm^2$ to about 900 $mm^2$. Users may unintentionally press against the cartridge ejection button 30 during shaving. Accordingly, the recessed area 32 may help prevent the cartridge ejection button 30 from being unintentionally activated by a user during shaving. In certain embodiments, the recessed area 32 may also be large enough for a user to position their finger within the recessed area 32 without activating the cartridge ejection button 30. For example, the cartridge ejection button 30 may be spaced a distance of about 10 mm to about 20 mm, and more preferably about 12 mm to about 16 mm from the rear rim 38. The distance between the cartridge ejection button 30 and the rear rim 30 may also help guide a user's finger to actuate the shaving razor cartridge 12. The proximal end 22 of the shaving razor handle 14 may include a cartridge connecting structure 40 for connecting and disconnecting the shaving razor cartridge 12 to the proximal end 22 of the shaving razor handle 14.

Figure 3:
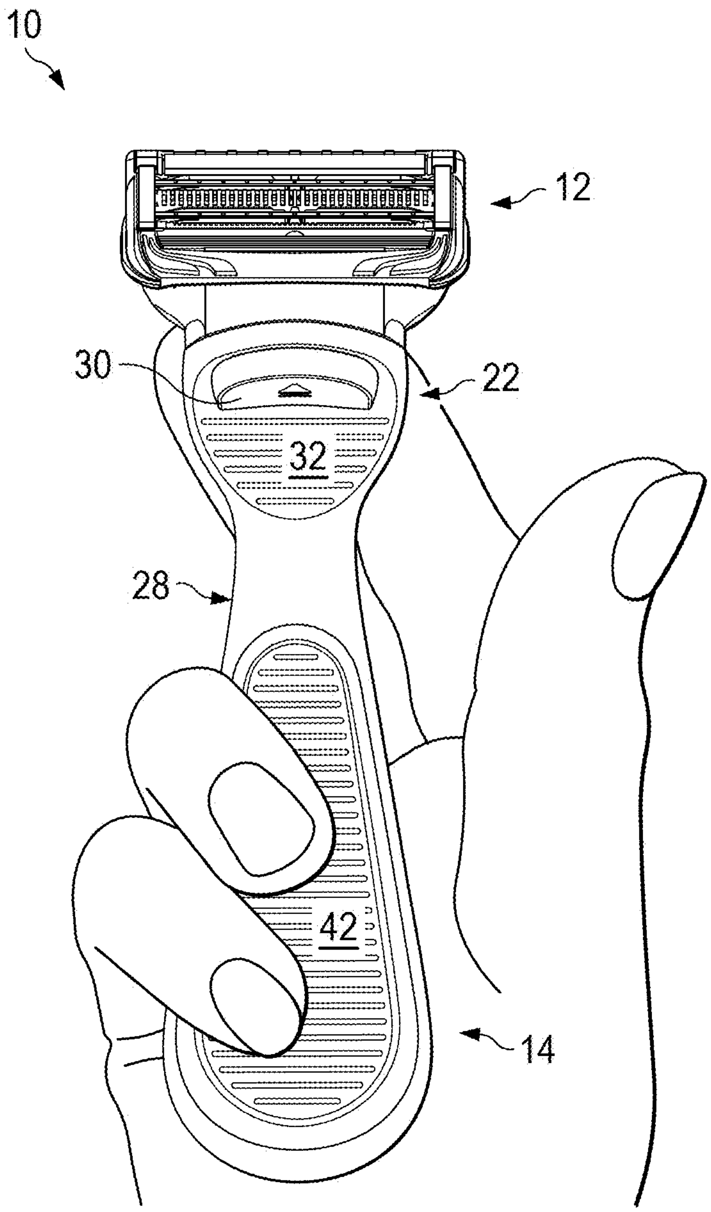
FIG. 3 is a bottom view of the shaving razor system of FIG. 2 being held by a user.

The lower surface 28 of the shaving razor handle 14 may define a recessed area 42 located toward the distal end 24. The recessed area 42 toward the distal end 24 may be spaced apart from the recessed area 32 toward the proximal end 22. For example, the neck 26 may be positioned between the recessed area 42 toward the distal end 24 and the recessed area 32 toward the proximal end 22. The neck 26 may have a width of about 12 mm to about 18 mm. The recessed area 42 may be configured to receive multiple digits of a user. For example, the recessed area 42 may have a surface area of about 800 $mm^2$ to about 1500 $mm^2$, and more specifically about 900 $mm^2$ to about 1200 $mm^2$. The recessed area 42 may have a length "L1" of about 45 mm to about 75 mm, about 50 mm to about 70 mm, and more specifically 60 mm to about 65 mm. The recessed area 42 may taper from a larger width toward a distal end 44 of the recessed area 42 to a smaller width toward a proximal end 46 of the recessed area 42. For example, the recessed area 42 toward the proximal end 46 may have a width of about 5 mm to about 15 mm measured about 2 mm to about 10 mm from the proximal end 46, and more specifically, about 10 mm to about 12 mm measured about 2 mm to about 10 mm from the proximal end 46. The recessed area 42 toward the proximal end 46 may have a width of about 20 mm to about 30 mm measured about 2 mm to about 10 mm from the distal end 44 of the recessed area 42, and more specifically, about 23 mm to about 27 mm measured about 2 mm to about 10 mm from the distal end 44. The recessed area 42 may optionally include a plurality of gripping features, such as protrusions. In certain embodiments, the recessed area 42 toward the distal end 44 and the proximal end 46 may be rounded. For example, the recessed area 42 toward the distal end 44 may have a first radius of about 10 mm to about 13 mm and the recessed area 42 toward the proximal end 46 may have a first radius of about 5 mm to about 7 mm. As shown in FIG. 3, the shape, size and the position of the recessed area 42 may facilitate the placement of multiple digits of a user against the recessed area 42 for better control of the shaving razor system 10 during shaving of the pubic region. In certain embodiments, the recessed area 42 may comprise a softer material, such as a thermoplastic elastomer having a Shore A hardness of about 10 to about 60 to further improve grip.

Figure 2:
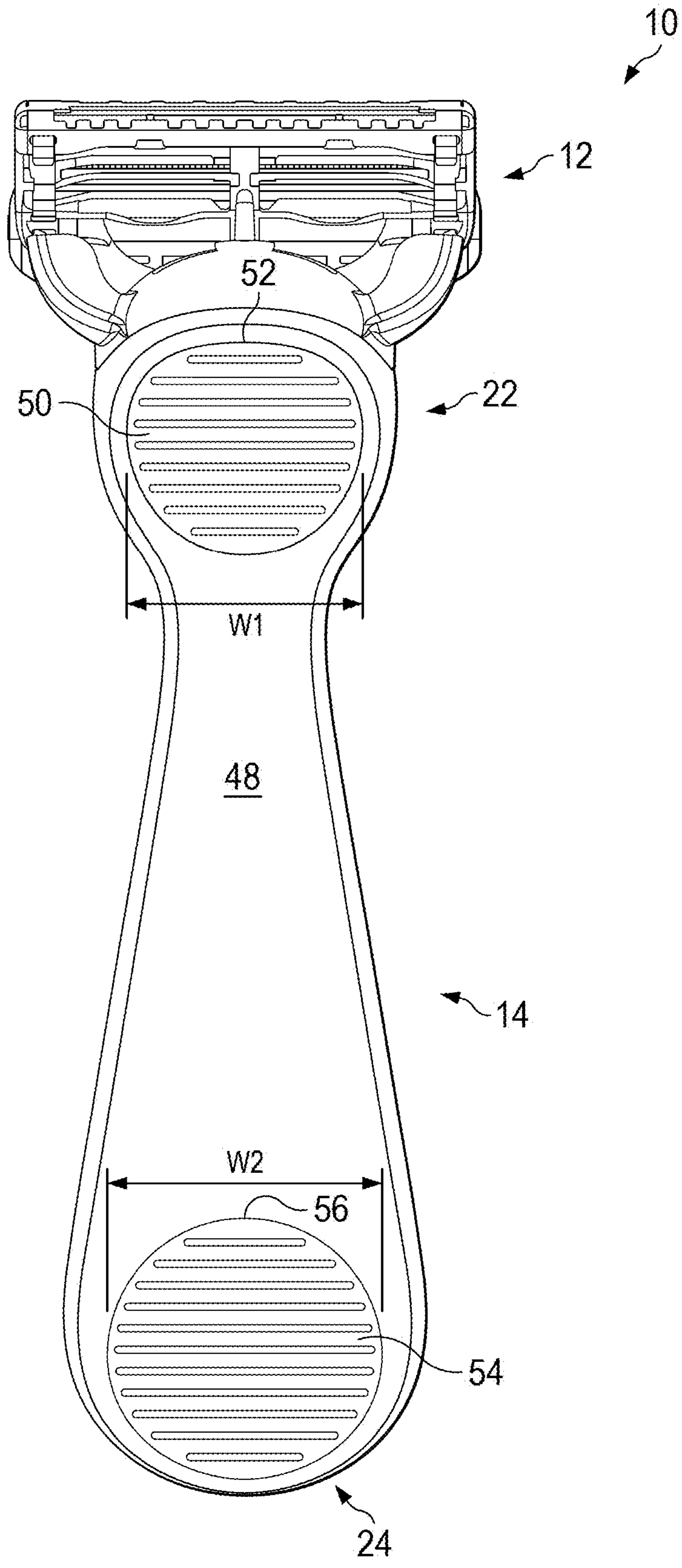
FIG. 2 is a top view of the shaving razor system of FIG. 1, with an attached shaving razor cartridge.

Referring to FIG. 2 a top perspective view of the shaving razor system 10 is illustrated with the shaving razor cartridge 12 mounted to the proximal end 22 of the shaving razor handle 14. The shaving razor handle 14 may have an upper surface 48 extending between the proximal end 22 and the distal end 24. The upper surface 48 may be generally convex. The upper surface 48 may define a recessed area 50 configured to receive one or more digits of a user. In certain embodiments, the recessed area may be dimensioned to accommodate two digits of a user (see FIG. 2) for improved control of the shaving razor system 10 during shaving of the pubic region. For example, the recessed area 50 may have a width "w1" of about 20 mm to about 35 mm and more specifically about 25 mm to about 30 mm. The recessed area 50 may be generally circular and have a surface area of about 315 $mm^2$ to about 950 $mm^2$ and more specifically about 500 $mm^2$ to about 750 $mm^2$.

The recessed area 50 may include a forward edge 52 toward the proximal end 22 of the shaving razor handle 14. As shown in FIGS. 3, the positioning of the ejection button 30 within the recess area 32 and on the lower surface 28 of the shaving razor handle 14, allows the user to position one or more digits on the upper surface 48 (e.g., the recessed area 50) toward the proximal end 22 (FIG. 2) without inadvertently actuating the ejection button 30. In addition, facilitating the user to comfortably position one or more digits on the upper surface 48 closer to the shaving razor cartridge 12 and or the blades 16, allows improved control and thus more precise positioning of the shaving razor cartridge 12 on the surface of the skin, resulting in improved safety (e.g., less nicks and cuts) and greater user confidence. In certain embodiments, the upper surface 48 (including recessed area 50 and the recessed area 54) may comprise a softer material, such as a thermoplastic elastomer having a Shore A hardness of about 10 to about 60 to further improve grip.

In certain embodiments, the upper surface 48 may define a recessed area 54 toward the distal end 24 of the shaving razor handle 14. The recessed area 54 may allow a user to securely grip the distal end 24 of the shaving razor handle 14. For example, a user may pinch the distal end 24 by gripping the recessed area 54 of the upper surface 48 and the recessed area 42 of the lower surface 28 (FIG. 1) between their thumb and one of their fingers. Accordingly, the thickness of the shaving razor handle 14 between the recessed area 54 of the upper surface 48 and the recessed area 42 of the lower surface 28 (FIG. 1) may be less than the nominal thickness of the shaving razor handle 14. The recessed area 54 may have an outer rim 56. The recessed area 54 may have a width "w2" of about 20 mm to about 35 mm and more specifically about 25 mm to about 30 mm. The recessed area 54 may be generally circular and have a surface area of about 315 $mm^2$ to about 950 $mm^2$ and more specifically about 500 $mm^2$ to about 750 $mm^2$.

Figure 4:
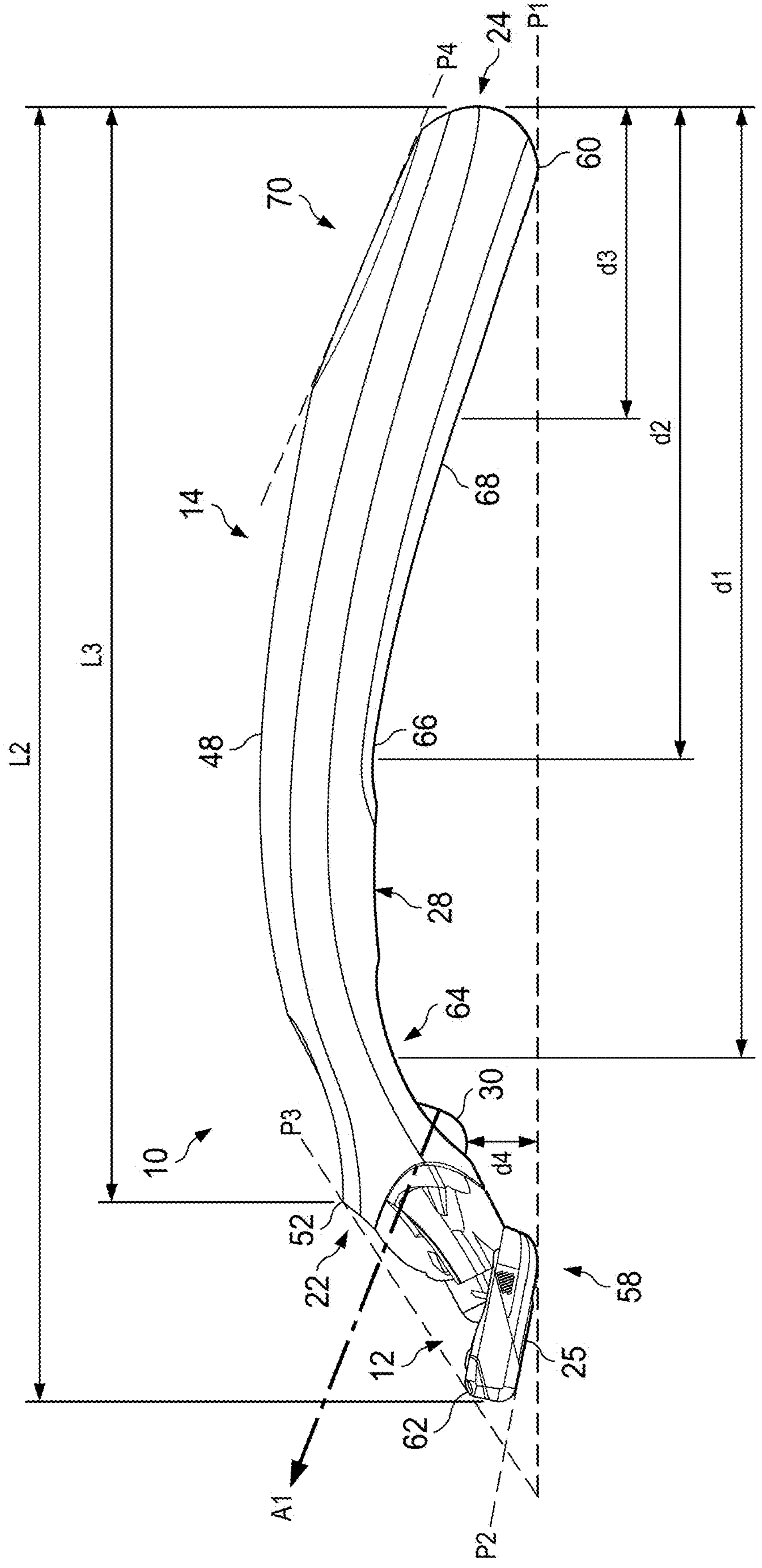
FIG. 4 is a side view of the shaving razor system of FIG. 2.

Referring to FIG. 4, a side view of the shaving razor system 10 is illustrated. As shown in FIG. 4, the upper surface 48 may be a generally convex and the lower surface 28 may be generally concave. The distal end 24 of the shaving razor handle 14 may include a lower contacting surface 60. The shaving razor cartridge 12 and the lower contacting surface 60 of the distal end 24 may define a generally horizontal resting plane P1 with areas of contact to the generally horizontal resting plane P1 includes the shaving razor cartridge 12 (e.g., distal portion 58 of the shaving razor cartridge 12) and the lower contacting surface 60 of the distal end 24. The shaving surface 25 and the lower surface 28 of the shaving razor handle 14 may face in the same general direction, i.e., toward the generally horizontal resting plane P1. The upper surface 48 may face away from the generally horizontal resting plane P1. The shaving surface 25 (FIG. 1) may extend along a shave plane P2. The shaving razor cartridge 12 and the shaving surface 25 may rest in a neutral position on the shave plane P2. The generally horizontal resting plane P1 and the shave plane P2 may define an angle less than 15 degrees. For example, the shave plane P2 and the generally horizontal resting plane P1 may define an angle of about 0 degrees to about 14 degrees, preferably about 5 degrees to about 14 degrees and more preferably about 8 degrees to about 12 degrees.

In certain embodiments, an area define by the generally horizontal resting plane P1 and the shaving razor system 10 (e.g., area of an underside of the shaving razor system 10 that includes the shaving razor cartridge 12 spaced apart from the generally horizontal resting plane P1 and also the lower surface 28 of the shaving razor handle 14 generally horizontal resting plane P1) may be about 900 $mm^2$ to about 1300 $mm^2$, and more specifically about 1000 $mm^2$ to about 1200 $mm^2$. An overall length L2 extending from a proximal end 62 of the shaving razor cartridge 12 to the distal end 24 of the shaving razor handle 14 may be less than 135 mm. For example, the overall length L2 may be about 115 mm to about 130 mm and more preferably about 120 mm to about 126 mm. The shaving razor handle 14 (i.e., the lower surface 28) may be spaced furthest apart from the generally horizontal resting plane P1 at about 40% to about 60% of the length L2 and more specifically at about 45% to about 55% of the overall length L2, measured from the distal end 24. Accordingly, the lower surface 28 of the shaving razor handle 14 may be spaced furthest apart from the generally horizontal resting plane P1 toward the middle of the shaving razor handle 14. For example, the shaving razor handle 14 (i.e., the lower surface 28) may be spaced apart from the generally horizontal resting plane P1 a distance of about 25 mm to about 35 mm at about 40% to about 60% (and more specifically at about 45% to about 55% of the overall length L2), measured from the distal end 24. In certain embodiments, the shaving razor handle 14 may have a length "L3" that extends from the forward edge 52 to the distal end 24 about 100 mm to about 115 mm. Accordingly, the shaving razor handle 14 may comfortably rest within the palm of an average female user, allowing them to place one or more digits on the recessed area 50, as shown in FIG. 3, while securing the distal end 24 of the shaving razor handle 14 in the palm of their hand.

The lower surface 28 may be generally concave. For example, the lower surface 28 may follow a generally curved path that resembles a portion of an ellipse or parabola. Areas along the lower surface 28 may be spaced apart from the generally horizontal resting plane P1 by a greater distance toward the middle of the shaving razor handle 14. For example, the shaving razor handle 14 may have a first lower surface 64 located at a distance "d1" of about 82 mm to about 86 mm from the distal end 24. The first lower surface 64 may be spaced apart from the generally horizontal resting plane P1 by about 14 mm to 16 mm. The shaving razor handle 14 may have a second lower surface 66 located at a distance "d2" of about 66 mm to about 70 mm from the distal end 24. The shaving razor handle 14 may be spaced furthest from the generally horizontal resting plane P1 at the distance "d2". The second lower surface 66 may be spaced apart from the generally horizontal resting plane P1 by about 14 mm to 18 mm. The shaving razor handle 14 may have a third lower surface 68 located at a distance "d3" of about 27 mm to about 31 mm from the distal end 24. The third lower surface 68 may be spaced apart from the generally horizontal resting plane P1 by about 6 mm to 10 mm.

As shown in FIG. 4, the cartridge ejection button 30 on the lower surface 28 of the shaving razor handle 14 may face the generally horizontal resting plane P1. The cartridge ejection button 30 may be spaced apart from the generally horizontal resting plane P1 a distance "d4" of about 5 mm to about 10 mm and more preferably about 6 mm to about 8 mm. Accordingly, the cartridge ejection button 30 may be far enough away from the surface of the skin so it does not impact shaving strokes or result in inadvertent ejection of the shaving razor cartridge 12.

Figure 5:
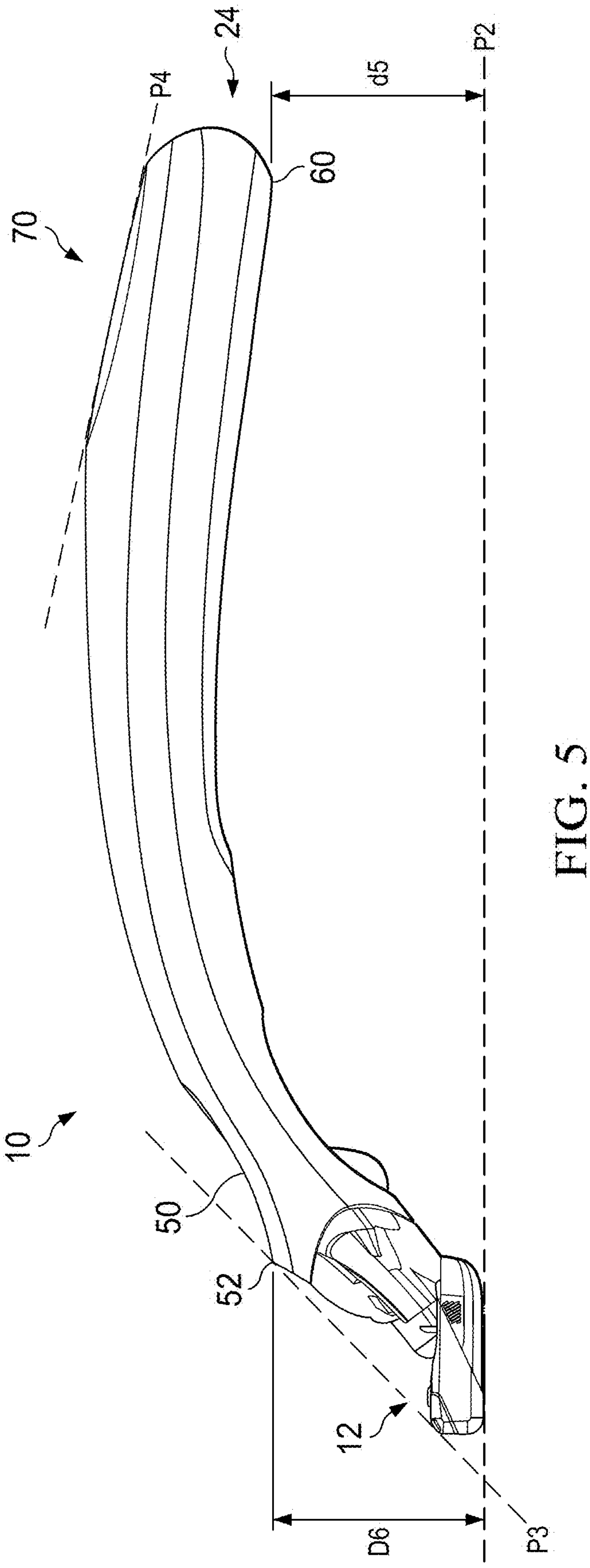
FIG. 5 is another side view of the shaving razor system of FIG. 2.

Referring to FIG. 5, a side view of the shaving razor system 10 is illustrated with the shave plane P2. The lower contacting surface 60 at the distal end 24 of the shaving razor handle 14 may be the lowermost surface of the shaving razor handle 12. For example, the lower contacting surface 60 may be spaced apart from the shave plane P2 by a distance "d5" less than 45 mm when the shaving razor cartridge 12 is in a neutral or at rest position. In certain embodiments, d5 may be about 15 mm to about 40 mm, preferably about 15 to about 30, and more preferably about 15 mm to about 25 mm. It is understood the lower contacting surface 60 need not be at the ultimate end of the shaving razor handle 14. For example, the lower contacting surface 60 may be located within 10 mm from the distal end 24 of the shaving razor handle 14.

The shave plane P2 may intersect a plane P3 (also shown in FIG. 4) that is tangent to the forward edge 52 of the recessed area 50 and the shaving razor cartridge 12 an angle of about 20 degrees to about 25 degrees. The plane P3 may also intersect the generally horizontal resting plane P1 at an angle of about 20 degrees to about 30 degrees, as shown in FIG. 4. A tail 70 located toward the distal end 24 of the shaving razor handle 14 may have a gradual downward slope toward the shave plane P2 and the generally horizontal resting plane P1. For example, a plane P4 tangent to the tail 70 and the shave plane P2 may define an angle of about 10 degrees to about 15 degrees. The plane P4 and the generally horizontal resting plane P1 may also define an angle of about 20 degrees to about 25 degrees.

Figure 6:
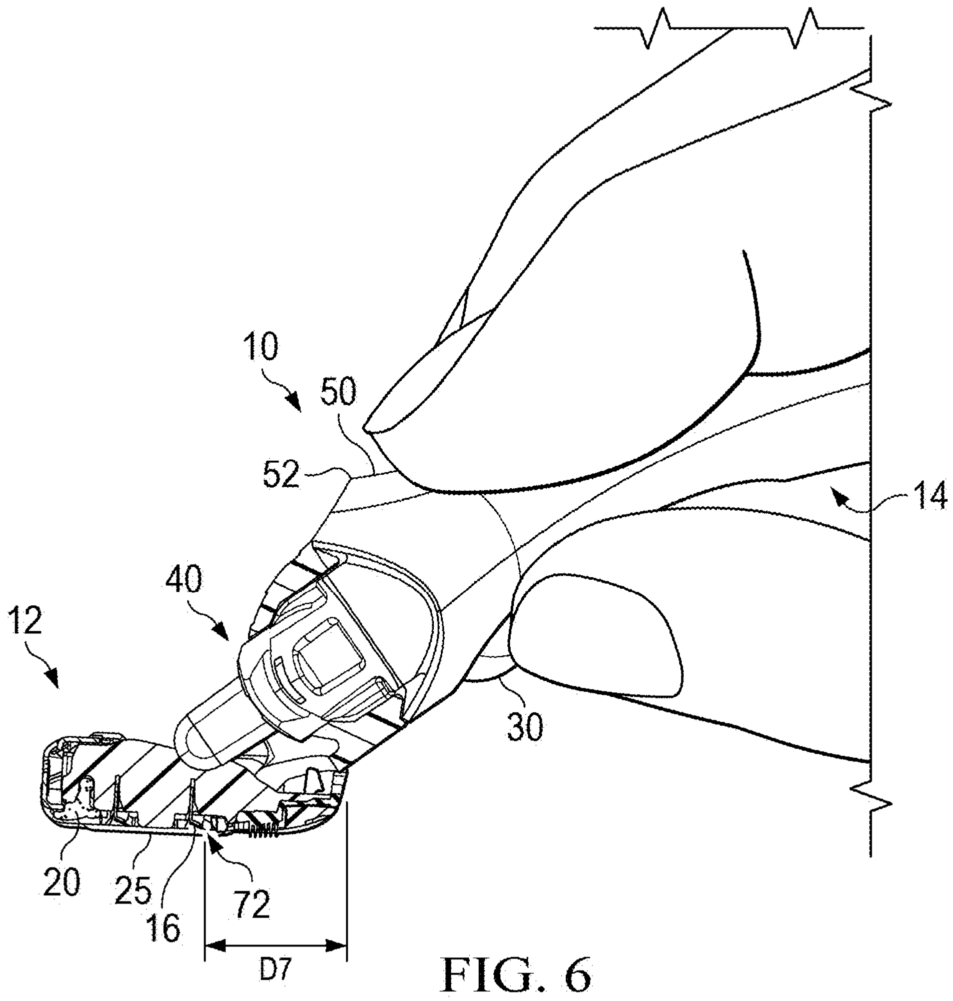
FIG. 6 is an enlarged side view of the shaving razor system of FIG. 2.

As shown in FIGS. 5 and 6, the forward edge 52 of the recessed area 50 may facilitate locating a user's grip closer to the shaving razor cartridge 12, and thus one or more of the blades 16, for improved precision, especially for edging. Accordingly, the forward edge 52 may be a vertical distance "d6" (perpendicular to the shave plane P2) of about 15 mm to about 25 mm and preferably about 19 mm to about 21 mm from the shave plane P2. The forward edge 52 may also be a horizontal distance "d7" (parallel to the shave plane P2) of about 5 mm to about 10 mm and preferably about 6 mm to about 9 mm from a cutting edge 72 of the closest blade 16. The position of recessed area 50 and the forward edge 52 of the shaving razor handle 14 may enable closer placement of a user's digits to the desired shaving area. Accordingly, the recessed area 50 may be shaped and positioned to receive the digit(s) of a user and not for placement of an ejection button.

The dimensions and values disclosed herein are not to be understood as being strictly limited to the exact numerical values recited. The dimensions should not be held to an impossibly high standard of metaphysical identity that does not allow for discrepancies due to typical manufacturing and measuring tolerances. Therefore, the term "about" should be interpreted as being within typical manufacturing and measuring tolerances.

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A shaving razor system comprising:

a shaving razor handle having an upper surface that is generally convex and an opposing lower surface that is generally concave;

the lower surface defining a recessed area located toward a distal end of the handle configured to receive multiple digits of a user, the recessed area located toward the distal end having a surface area of about 800 $mm^2$ to about 1500 $mm^2$ and a length about of 45 mm to about 75 mm;

the upper surface defining a recessed area located toward a proximal end of the handle configured to receive one or more digits of a user, the recessed area located toward the proximal end having a width of about 20 mm to about 35 mm; and a shaving razor cartridge having at least one blade with a cutting edge, wherein the shaving razor cartridge is mounted to the proximal end of the handle.

2. The shaving razor system of claim 1 wherein a distance from the cutting edge to a forward edge of the recessed area located toward the proximal end is about 5 mm to about 10 mm.

3. The shaving razor system of claim 1 wherein the recessed area located toward proximal end has a width of about 20 mm to about 35 mm.

4. The shaving razor system of claim 1 wherein the recessed area located toward the distal end tapers from a larger width toward the distal end to a smaller width toward the proximal end.

5. The shaving razor system of claim 4 wherein the larger width is about 25 mm to about 35 mm and the smaller width is about 10 mm to about 20 mm.

6. The shaving razor system of claim 1 wherein the recessed area located toward the distal end has a surface area of about 900 $mm^2$ to about 1200 $mm^2$.

7. The shaving razor system of claim 1 wherein the recessed area located toward the distal end is about 60 mm to about 65 mm.

8. The shaving razor system of claim 1 wherein the recessed area located toward the proximal end comprises a plurality of protrusions.

9. The shaving razor system of claim 1 wherein the handle has a neck between the recessed area located toward the proximal end and the recessed area located toward the distal end, the neck having a width of about 12 mm to about 18 mm.

10. The shaving razor system of claim 1 wherein the recessed area located toward the distal end comprises a first radius of about 10 mm to about 13 mm toward the distal end and a second radius of about 5 mm to about 7 mm toward the proximal end.

11. The shaving razor system of claim 1 wherein the handle has a nominal thickness of about 10 mm to about 14 mm.

12. A shaving razor system comprising:

a handle having an upper surface that is generally convex and an opposing lower surface that is generally concave;

the upper surface defining a recessed area located toward a proximal end of the handle configured to receive one or more digits of a user, the recessed area located toward the proximal end having a width of about 20 mm to about 35 mm; and a shaving razor cartridge mounted to the proximal end of the handle, the shaving razor cartridge having at least one blade with a cutting edge, wherein a distance from the cutting edge to a forward edge of the recessed area of the proximal end is about 5 mm to about 10 mm.

13. The shaving razor system of claim 12 wherein the width of the recessed area located toward the proximal end is about 25 mm to about 30.

14. The shaving razor system of claim 12 wherein the distance from the cutting edge to the forward edge of the recessed area of the proximal end is about 6 mm to about 9 mm.

15. A shaving razor handle comprising:

an upper surface that is generally convex and an opposing lower surface that is generally concave;

the lower surface defining a recessed area located toward a distal end of the handle configured to receive multiple digits of a user, the recessed area located toward the distal end having a surface area of about 750 $mm^2$ to about 950 $mm^2$ and a length of about 50 mm to about 70 mm; and the upper surface defining a recessed area located toward a proximal end of the handle configured to receive multiple digits of a user, the recessed area located toward the proximal end having a width of about 20 mm to about 35 mm.

16. The shaving razor handle of claim 15 wherein the recessed area located toward the proximal end has a width of about 25 mm to about 30 mm.

17. The shaving razor handle of claim 15 wherein the recessed area located toward the distal end tapers from a larger width of about 25 mm to about 35 toward the distal end to a smaller width of about 10 mm to about 20 mm toward the proximal end.

18. The shaving razor handle of claim 15 wherein the recessed area located toward the distal end has a surface area of about 800 $mm^2$ to about 900 $mm^2$.

19. The shaving razor handle of claim 15 wherein the length of the recessed area located toward the distal end is about 60 mm to about 65 mm.

20. The shaving razor handle of claim 15 wherein the handle has a neck between the recessed area located toward the proximal end and the recessed area located toward the distal end, the neck having a width of about 12 mm to about 18 mm.

* * * * *